Patented Oct. 27, 1953

2,657,239

UNITED STATES PATENT OFFICE 2,657,239

PREPARATION OF HEXAMETHYLENE-DIAMINES

George W. Rigby, Wilmington, Del., assignor to E. I. du Pont de Nemours and Company, Wilmington, Del., a corporation of Delaware No Drawing. Application October 9, 1950, Serial No. 189,300

10 Claims. (Cl. 260—583)

This invention relates to the preparation of hexamethylenediamines and, more particularly, to a new and improved synthesis of such diamines.

Because of the position of hexamethylenediamine as a prime intermediate for nylon, methods for its synthesis are major research goals. The several commercial routes to hexamethylenediamine involve a multiplicity of steps which operate to increase cost and decrease overall yields. Accordingly, there is a continued need for a simpler and more economical route to this important chemical intermediate.

An object of the present invention is to provide a process of preparing hexamethylenediamines generally. A further object is to provide a new and improved process of preparing the specific compound, hexamethylenediamine. A still further and more specific object is to provide a process of preparing hexamethylenediamine which is simpler and more economical than the processes heretofore available. Other objects will be apparent from the description of the invention given hereinafter.

The above objects are accomplished according to the present invention by reacting adipaldehyde in a reaction medium liquid under the temperature and pressure conditions of the reaction with a compound of the formula

which R and R' are hydrogen or monovalent hydrocarbon radicals, present in a proportion of at least 2 mols per mol of adipaldehyde, and hydrogen at a temperature of 25° C.–150° C. and a pressure of at least 100 lb./sq. in. in the presence of a hydrogenation catalyst. In a more specific and preferred form the invention comprises reacting the adipaldehyde dissolved in benzene or dioxane, with ammonia present in a proportion of at least 10 mols per mol of adipaldehyde, and hydrogen at a temperature of 70° C.–125° C. and a pressure of 500–3000 lb./sq. in. in the presence of a cobalt or nickel hydrogenation catalyst.

It has now been found that adipaldehyde may be effectively converted to a hexamethylenediamine by reductive amination under the conditions recited above and thus there is provided a new route to hexamethylenediamines which is both simple to carry out and which avoids extensive and costly intermediate steps.

Although the specific manner in which the adipaldehyde is formed is not a part of this invention, it may conveniently be prepared by hydrogenating the cyclohexene ozonide resulting from the reaction of cyclohexene with ozone. For example, ozone can be passed into a methanol solution of cyclohexene at −80° C. to +20° C. and the methanol solution of the ozonide thus obtained can be placed in a closed reactor and treated with hydrogen under pressure at −15° C. to +15° C. in the presence of a hydrogenation catalyst whereby it is converted to adipaldehyde. This hydrogenation is more fully disclosed and claimed in an application filed of even date herewith in the name of Earl Eugene Fisher and entitled "Preparation of Aldehydes."

The following examples in which all proportions are by weight unless otherwise stated, illustrate specific embodiments of the invention.

EXAMPLE I

A. Preparation of adipaldehyde solution

A solution of 32.8 parts of cyclohexene in 400 parts of methanol was cooled to −75° C. by means of a carbon dioxide-acetone bath. A stream of oxygen containing 3% ozone was bubbled through the solution for a total of 7 hours whereby a solution of cyclohexene ozonide in methanol was formed. One-half of this solution was placed in a closed reactor and there was added 0.1 part of palladium-on-charcoal catalyst and the mixture treated with hydrogen at 35–40 lb./sq. in., with occasional cooling to maintain the temperature at 0° C. to +10° C. The reaction mixture was filtered to remove the catalyst and contained adipaldehyde dissolved in the methanol.

B. Reductive amination to hexamethylenediamine

A pressure reactor was charged with a solution of 12.2 parts of adipaldehyde in 160 parts of methanol, prepared as above, two parts of alloy skeleton nickel, and 10 parts of ammonia. The reactor was heated to 80° C. and pressured to 2000 lb./sq. in. with hydrogen and these conditions maintained for a period of three hours. The reaction mixture was then allowed to cool, the reactor opened, the contents discharged and filtered to remove the catalyst. Distillation of filtrate gave hexamethylenediamine B. P. 46–47° C. at 1–2 mm., identified as the picrate, M. P. 222° C.

EXAMPLE II 87 parts of adipaldehyde in 342 parts of dioxane was injected in small portions into a reactor containing 30 parts of alloy skeleton nickel, 100 parts of dioxane, and a mixture of ammonia and hydrogen at a total pressure of 800 lb./sq. in. at 80° C. The reaction mixture was further pressured with hydrogen to 2000 lb./sq. in. after the final injection of the adipaldehyde and these conditions maintained for one hour. The reactor was then allowed to cool, opened, the contents discharged and filtered to remove the catalyst. Distillation of the filtrate yielded hexamethylenediamine.

EXAMPLE III 57 parts of adipaldehyde dissolved in 192 parts of benzene was charged into a pressure reactor containing 200 parts of liquid ammonia, 25 parts of a nickel-on-carbon catalyst, and 4 parts of a palladium-on-carbon catalyst containing 10% palladium. The reactor was heated to 90° C. and pressured to 1000 lb./sq. in. with hydrogen. From the reaction mixture there was recovered hexamethylenediamine and hexamethyleneimine in a ratio of about 2:1.

The foregoing procedure was repeated but using 15 parts of cobalt-on-kieselguhr as the catalyst. Under these conditions hexamethylenediamine was obtained without the formation of any hexamethyleneimine.

EXAMPLE IV

A pressure reactor was charged with 18 parts of adipaldehyde, 10 parts of liquid ammonia, 8 parts of methanol, and 3 parts of alloy skeleton nickel. The reactor was heated to 110° C. and pressured with hydrogen to 2500 lb./sq. in. These conditions were maintained for 2 hours. From the reaction mixture hexamethylenediamine was isolated as the picrate.

It will be understood that the above examples are merely illustrative and that the invention broadly comprises reacting adipaldehyde in a liquid reaction medium with a compound of the formula

wherein R and R' are hydrogen or monovalent hydrocarbon radicals, present in a proportion of at least 2 mols per mol of adipaldehyde, and hydrogen at a temperature of 25° C.–150° C. and a pressure of at least 100 lb./sq. in. in the presence of a hydrogenation catalyst.

The present invention is applicable generally to the amination of adipaldehyde with ammonia and primary and secondary amines. That is, with any compound of the formula

wherein R and R' are hydrogen or monovalent hydrocarbon radicals. The use of ammonia in the amination leads to the formation of primary hexamethylenediamine; the primary amines yield secondary hexamethylenediamines while the secondary amines yield tertiary hexamethylenediamines. The use of at least 2 mols of the ammonia or amine per mol of the adipaldehyde is necessary and better results are obtained by using 10 to 20 or more mols per mol of adipaldehyde.

Suitable primary and secondary amines for use in this invention are the alkyl, aryl, and cycloaliphatic amines. Examples of such amines are methylamine, ethylamine, butylamine, dodecylamine, dimethylamine, methylethylamine, aniline, N-methylaniline, cyclohexylamine, and dicyclohexylamine. Through the selection of the amine, the desired specific hexamethylenediamine can be prepared.

The reductive amination of the adipaldehyde is carried out according to this invention in a reaction medium liquid under the conditions of the reaction. The reactive medium functions to bring about better contact between the reactants and, further, serves as a dissipator of the heat of reaction. Usually, a low boiling organic compound liquid at ordinary temperature and pressure and capable of dissolving the adipaldehyde will be used such as the lower boiling saturated, monohydric aliphatic alcohols having from 1 to 5 carbon atoms, inclusive, e. g., methanol, ethanol, isopropanol, and tertiary amyl alcohol, and benzene and dioxane. Ammonia or the primary or secondary amine used in the amination can be present in sufficient excess to serve as the reaction medium. Benzene and dioxane are preferred as their use eliminates the competitive and undesirable acetal forming reaction.

The amount of solvent or reaction medium present during the reaction is not critical. It can range from less than the weight of the adipaldehyde to many times greater than the weight of the adipaldehyde. Usually, the reaction medium will be present in an amount from that equal to the weight of the adipaldehyde to an amount 4 times greater than the weight of the adipaldehyde.

The reaction can be carried out at ordinary temperature, i. e., 25° C., but the reaction rate is rather slow at that temperature and a temperature of 50° C. to 150° C. will usually be employed. The preferred temperature range is 70° C. to 125° C.

Obviously, the reaction must be carried out at super-atmospheric pressure. A pressure of at least 100 lb./sq. in. should be used and, from the standpoint of yield and reaction rate, a pressure of 500–3000 lb./sq. in. is preferred.

A hydrogenation catalyst is essential for the reductive amination to proceed. Examples of suitable catalysts are nickel, cobalt, iron, palladium, and ruthenium. The preferred catalysts, because of their high order of activity and availability, and the good yields obtained therewith, are nickel and cobalt and especially alloy skeleton nickel and cobalt made by the alkali metal hydroxide extraction of aluminum-nickel and aluminum-cobalt alloys. The catalysts can be supported on inert extenders or they can be unsupported. Suitable extenders are carbon, silica, and alumina.

The amount of catalyst can vary widely from 0.01–30% or more of the weight of the adipaldehyde. Since good reaction rates, with catalyst economy, are realized using 1–20%, by weight of the adipaldehyde of catalyst calculated as the metal, this embraces the preferred catalyst concentration.

A typical method for preparing alloy-skeleton nickel usefully employable as a catalyst in the process of this invention is the following:

Three hundred grams of a finely powdered alloy composed of equal parts of nickel and aluminum is added with stirring over a period of 1.5 hours to a solution of 342 grams of sodium hydroxide dissolved in 1590 grams of distilled water, maintained at 50° C. The supernatant liquid is decanted and the catalyst washed with distilled water until free of alkali. The washed catalyst can be stored under methanol or it can be dried in a non-oxidizing atmosphere and stored under non-oxidizing conditions.

An advantage of this invention is that it provides a new route to hexamethylenediamines which is simple and avoids the costly intermediate steps heretofore considered necessary. The process can be run batchwise or in a semi-continous or continuous manner.

As many apparently widely different embodiments of this invention may be made without departing from the spirit and scope thereof, it is to be understood that the invention is not limited to the specific embodiments thereof except as defined in the appended claims.

The invention claimed is:

1. Process of preparing a hexamethylenediamine which comprises reacting adipaldehyde in a liquid reaction medium with a compound of the formula

wherein R and R' are from the group consisting of hydrogen and alkyl, aryl, and cycloaliphatic radicals of 1 to 12 carbon atoms, inclusive, present in a proportion of at least two mols per mol of adipaldehyde, and hydrogen at a temperature of 25° C.–150° C. and a pressure of at least 100 lb./sq. in. in the presence of a hydrogenation catalyst.

2. Process as set forth in claim 1 wherein the reaction is carried out at a temperature of 70° C.–125° C. and a pressure of 500–3000 lb./sq. in.

3. Process as set forth in claim 2 wherein said compound of the formula

is present in a proportion of at least 10 mols per mol of adipaldehyde.

4. Process as set forth in claim 3 wherein the hydrogenation catalyst is selected from the group consisting of cobalt and nickel.

5. Process as set forth in claim 4 wherein said reaction medium is selected from the group consisting of benzene and dioxane.

6. Process of preparing hexamethylenediamine which comprises reacting adipaldehyde in a liquid reaction medium with ammonia present in a proportion of at least two mols per mol of adipaldehyde, and hydrogen at a temperature of 25° C.–150° C. and a pressure of at least 100 lb./sq. in. in the presence of a hydrogenation catalyst.

7. Process as set forth in claim 6 wherein the reaction is carried out at a temperature of 70° C.–125° C. and a pressure of 500–3000 lb./sq. in.

8. Process as set forth in claim 7 wherein said ammonia is present in a proportion of at least 10 mols per mol of adipaldehyde.

9. Process as set forth in claim 8 wherein the hydrogenation catalyst is selected from the group consisting of cobalt and nickel.

10. Process as set forth in claim 9 wherein said reaction medium is selected from the group consisting of benzene and dioxane.

GEORGE W. RIGBY.

References Cited in the file of this patent

UNITED STATES PATENTS

| Number | Name | Date |
|---|---|---|
| 1,989,325 | Lommel et al. | Jan. 29, 1935 |
| 2,045,574 | Adkins et al. | June 30, 1936 |